Sept. 6, 1949. H. W. TUCKER 2,481,178
AUTOMOBILE POCKET
Filed March 3, 1947
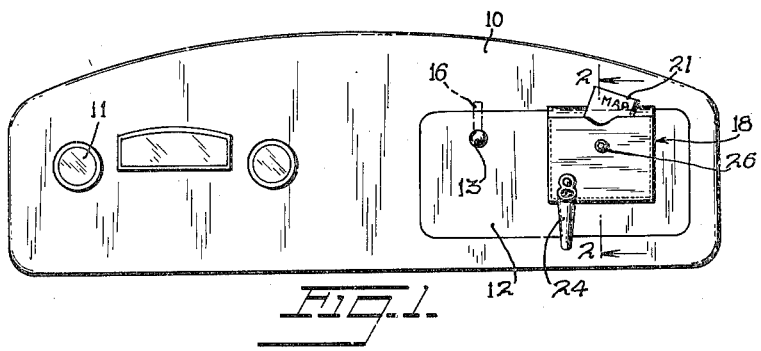
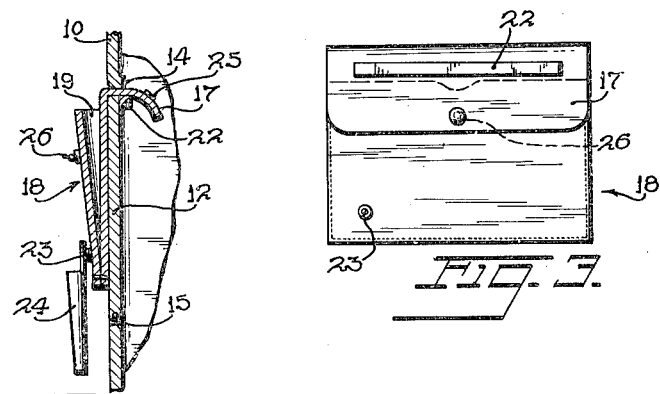
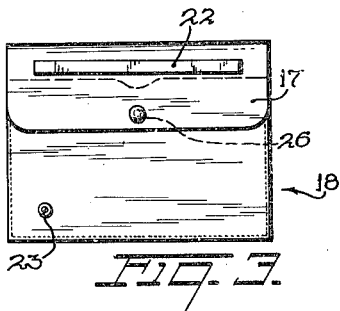
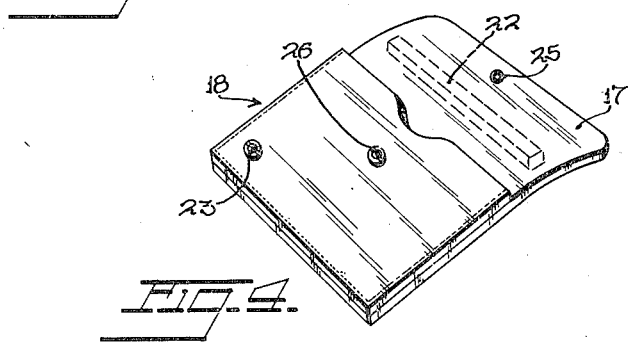
INVENTOR.
HARRY W. TUCKER
BY
*ATTORNEY*

Patented Sept. 6, 1949

2,481,178

UNITED STATES PATENT OFFICE 2,481,178

AUTOMOBILE POCKET

Harry W. Tucker, Long Branch, N. J.

Application March 3, 1947, Serial No. 732,070

1 Claim. (Cl. 224—42.44)

This invention relates to automobile pockets adapted for retaining maps, driving glasses, letters to be mailed and other such items which may be brought into an automobile.

It is an object of the present invention to provide a visible and easily accessible receptacle adapted for use on an instrument board of an automobile to contain maps, driving glasses, letters to be mailed, memoranda of errands to be done and the like, wherein these articles will be within easy reach of the driver while the car is in motion.

It is another object of the present invention to provide a case for maps which when not in use can be readily separated from the instrument board and deposited in the glove compartment.

It is another object of the present invention to provide a map case so constructed that its flap for concealing the articles within the case can be turned back and extended over the edge of a glove compartment door so as to be suspended therefrom when the door is closed and wherein stop means will be provided upon the flap to positively prevent the withdrawal of the flap of the map case from the edge of the door without first opening the compartment door.

It is still another object of the present invention to provide in a map case adapted to be suspended from the top edge of a glove compartment door, a detachable pencil receptacle adapted to be suspended from a fastener element on the lower edge of the map case.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a plan view looking upon the front of an instrument board having a glove compartment therein, a map case embodying the features of the present invention extending over and suspended from the top edge of the glove compartment door.

Fig. 2 is a cross sectional view taken on line 2—2 of Fig. 1, looking in the direction of the arrows thereof.

Fig. 3 is a front view of the map case with the flap secured in place over the opening, the case free of the compartment door and ready to be stored in the compartment when not in use or adapted for an individual to carry articles after having left the automobile.

Fig. 4 is a perspective view of the map case with the flap in its open position ready to be inserted over the edge of a glove compartment door.

Referring now to the figures, 10 represents an instrument board of a motor vehicle having instruments 11 thereon and a glove compartment closed by a door 12 adapted to be hinged downwardly when grasped by its handle 13. The door 12 has an upper edge adapted to be aligned with the top edge 14 of the compartment opening. The lower edge of the door 12 is hinged at 15 to the lower part of the opening. Any form of latch as indicated at 16 will retain the door 12 in its closed position.

Adapted to be supported over the upper edge of the door 12 is a flap 17 forming a part of a map case 18 having a pocket 19 open at its upper end for receiving a map 21 or any other articles such as glasses, letters, memoranda which need to be readily accessible to the driver or the passenger while the vehicle is in motion.

In order to prevent the flap 17 from sliding through the top of the compartment opening and over the top edge of the door, there is provided upon the flap an elongated projection 22. This projection 22 serves as a stop and will positively prevent the removal of the map case from the instrument board without first opening the door 12.

On the bottom edge of the map case is a snap element 23 to which a pencil receptacle 24 can be detachably connected. At times when the map case is not in use its flap 17 can be folded over so that its fastener element 25 will engage with a fastener element 26 on the body of the case. Thereafter the case can be maintained closed and kept in the compartment when not in use or can be used as a flat wallet in a handbag or suit pocket.

The flap material is thin enough to latch over the edge of the door even if the door is tightly fitted. The projection 22 may be formed of a heavy leather strap and is thick enough to prevent the pocket or case from pulling out when the compartment door is closed and latched. The flap is of suitable size and the strap or stop projection 22 is so located that the top edge of the door will close only on the flap thickness itself with the stop safely inside of the compartment to anchor the map case to the door.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In combination with the dashboard of a motor vehicle having a glove compartment formed with a front opening closed by a door pivotally mounted along its bottom edge to be openable, a case, comprising a pocket having front and rear walls and an opening along its top edge, a flap continuing from the top of said rear wall and extendable across the top opening and along the front wall for closing said top opening, cooperative fastening elements on said flap and said front wall for holding said flap in a position closing said top opening, said flap in the released condition of said fastening element being extendable rearward from said rear wall so that the material of said case at the junction of said flap and said rear wall may be clamped between the top edge of the door and the adjacent material of the dashboard defining the front opening of the glove compartment with said pocket depending along the outer face of the door with said top opening exposed so that desired articles may be inserted into said pocket, and a stop member on said flap closely adjacent said junction for engaging the inside face of the door to prevent the withdrawal of said flap from its clamped position between the top edge of the door and the material of the dashboard except when the door is opened, said stop member comprising an elongated strap extended transversely of said flap and secured to the outer face thereof closely adjacent said junction.

HARRY W. TUCKER.

REFERENCES CITED

The following references are of record in the file of this patent:

UNITED STATES PATENTS

| Number | Name | Date |
| --- | --- | --- |
| 1,523,323 | Wensinger | Jan. 13, 1925 |
| 1,606,944 | Johnson | Nov. 16, 1926 |
| 2,429,661 | Amsterdam | Oct. 28, 1947 |